United States Patent
Rom et al.

(10) Patent No.: US 9,808,711 B2
(45) Date of Patent: *Nov. 7, 2017

(54) METHOD AND APPARATUS FOR PROCESSING CONTROL SIGNALS OF AN ACCESSORY

(71) Applicant: STEELSERIES APS, Frederiksberg (DK)

(72) Inventors: Kim Rom, San Francisco, CA (US); Jeffrey Nicholas Mahlmeister, Chicago, IL (US); Jacob Wolff-Petersen, Richmond (GB); Bruce Hawver, Hawthorn Woods, IL (US); Francis Arnold Grever, Palatine, IL (US); Tino Soelberg, Valby (DK); Christopher John Nicolella, Elk Grove Village, IL (US)

(73) Assignee: STEELSERIES APS, Frederiksberg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,025

(22) Filed: Jul. 12, 2016

(65) Prior Publication Data

US 2016/0317917 A1    Nov. 3, 2016

Related U.S. Application Data

(63) Continuation of application No. 13/777,616, filed on Feb. 26, 2013, now Pat. No. 9,415,301.

(51) Int. Cl.
*A63F 13/422* (2014.01)
*A63F 13/235* (2014.01)
(Continued)

(52) U.S. Cl.
CPC .......... *A63F 13/235* (2014.09); *A63F 13/06* (2013.01); *A63F 13/10* (2013.01); *A63F 13/23* (2014.09);
(Continued)

(58) Field of Classification Search
CPC ................... A63F 13/67; A63F 13/422; A63F 2300/6027; A63F 2300/6054
See application file for complete search history.

(56) References Cited

U.S. PATENT DOCUMENTS 4,657,247 A    4/1987   Okada et al.
4,679,789 A    7/1987   Okada et al.
(Continued)

FOREIGN PATENT DOCUMENTS

WO    9214983    9/1992

OTHER PUBLICATIONS

"Call of Duty® Elite", http://www.callofduty.com/elite, Dec. 29, 2011, 1 page.
(Continued)

*Primary Examiner* — Steven J Hylinski
(74) *Attorney, Agent, or Firm* — Guntin & Gust, PLC; Ralph Trementozzi

(57) ABSTRACT

A system that incorporates the subject disclosure may include, for example, a system having a processor that performs operations including receiving from a computer accessory a control signal for controlling a software application, determining a result that would arise if the control signal is supplied to the software application, and generating an updated control signal to produce a desired result responsive to detecting that the result is undesirable. Additional embodiments are disclosed.

20 Claims, 14 Drawing Sheets

(51) Int. Cl.
  *A63F 13/40*  (2014.01)
  *A63F 13/20*  (2014.01)
  *A63F 13/23*  (2014.01)
  *A63F 13/79*  (2014.01)
  *A63F 13/837* (2014.01)

(52) U.S. Cl.
  CPC ............ *A63F 13/422* (2014.09); *A63F 13/79* (2014.09); *A63F 13/837* (2014.09); *A63F 2300/6054* (2013.01)

(56) References Cited

U.S. PATENT DOCUMENTS

| | | |
|---|---|---|
| 5,112,051 A | 5/1992 | Darling et al. |
| 5,624,316 A | 4/1997 | Roskowski et al. |
| 5,991,043 A | 11/1999 | Andersson et al. |
| 6,053,814 A | 4/2000 | Pchenitchnikov et al. |
| 6,196,917 B1 | 3/2001 | Mathias et al. |
| 6,461,237 B1 | 10/2002 | Yoshinobu et al. |
| 6,638,160 B2 | 10/2003 | Yoshitomi et al. |
| 6,746,331 B1 | 6/2004 | Saikawa et al. |
| 6,913,536 B2 | 7/2005 | Tomizawa et al. |
| 7,361,091 B2 | 4/2008 | Letovsky et al. |
| 2001/0029202 A1 | 10/2001 | Kondo et al. |
| 2003/0130031 A1 | 7/2003 | Yoshida et al. |
| 2003/0177347 A1 | 9/2003 | Schneier et al. |
| 2006/0121991 A1 | 6/2006 | Borinik et al. |
| 2007/0059670 A1 | 3/2007 | Yates et al. |
| 2007/0082729 A1 | 4/2007 | Letovsky et al. |
| 2007/0243926 A1 | 10/2007 | Cheng et al. |
| 2009/0228479 A1 | 9/2009 | Nishiyama et al. |
| 2009/0247250 A1 | 10/2009 | Kato et al. |
| 2010/0009733 A1 | 1/2010 | Garvin et al. |
| 2010/0009737 A1 | 1/2010 | Lutnick et al. |
| 2010/0062859 A1 | 3/2010 | Rice et al. |
| 2010/0081507 A1* | 4/2010 | Finocchio ............... A63F 13/10 463/37 |
| 2011/0093924 A1 | 4/2011 | Thompson |
| 2012/0129595 A1 | 5/2012 | Kim et al. |
| 2012/0172098 A1 | 7/2012 | Baker et al. |
| 2013/0123004 A1* | 5/2013 | Kruglick ............... A63F 13/355 463/29 |
| 2014/0066124 A1 | 3/2014 | Novet et al. |
| 2014/0365412 A1 | 12/2014 | Mizrachi |

OTHER PUBLICATIONS

"ESL—The eSports League", http://www.esl.eu/, Dec. 29, 2011, 2 pages.
"HLTV News", http://www.hltv.org/, Dec. 29, 2011, 2 pages.
"Hypefestation if Back", http://www.beyondgaming.com/, Dec. 29, 2011, 3 pages.
"Join millions of players online and discover the most Epic gaming experiences . . . ever!", http://us.battle.net/en/, Dec. 29, 2011.

* cited by examiner

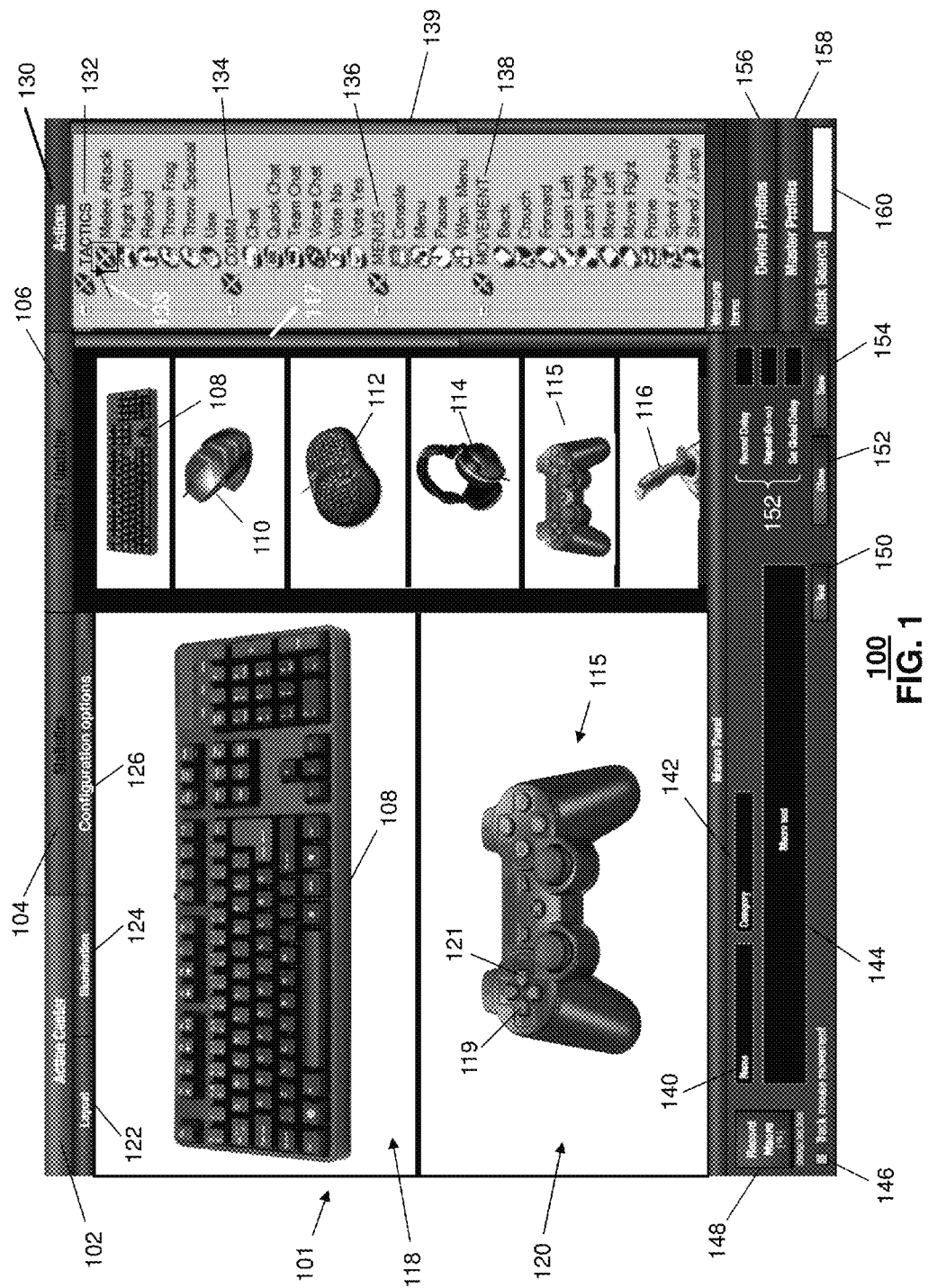

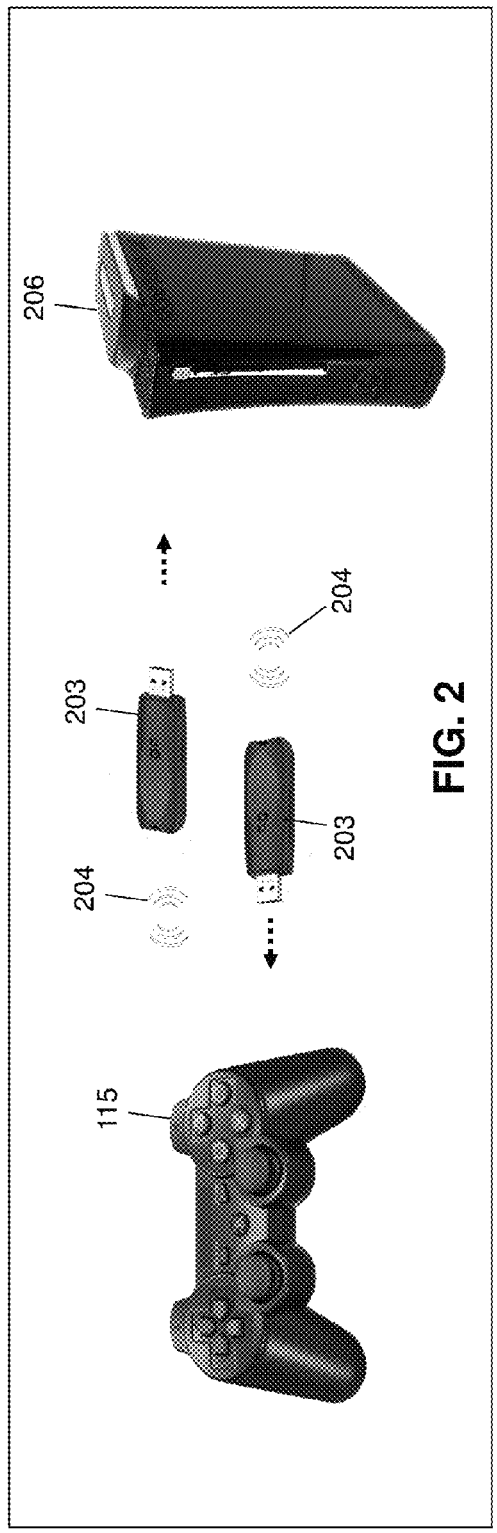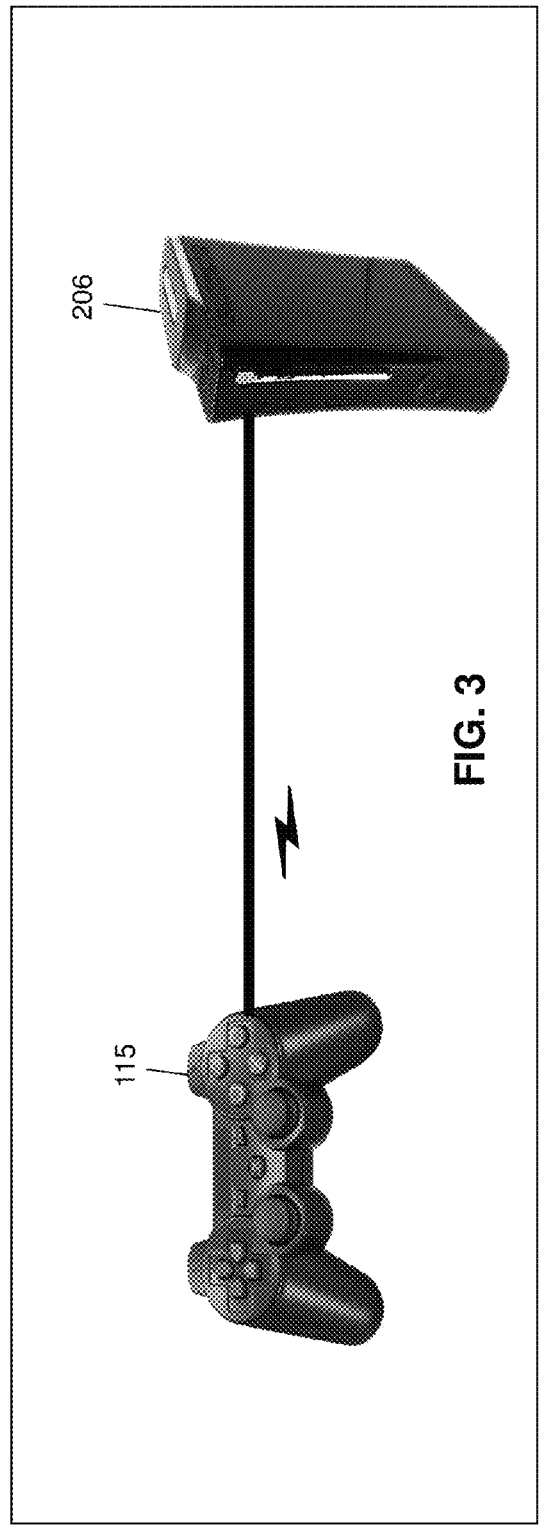

400

500

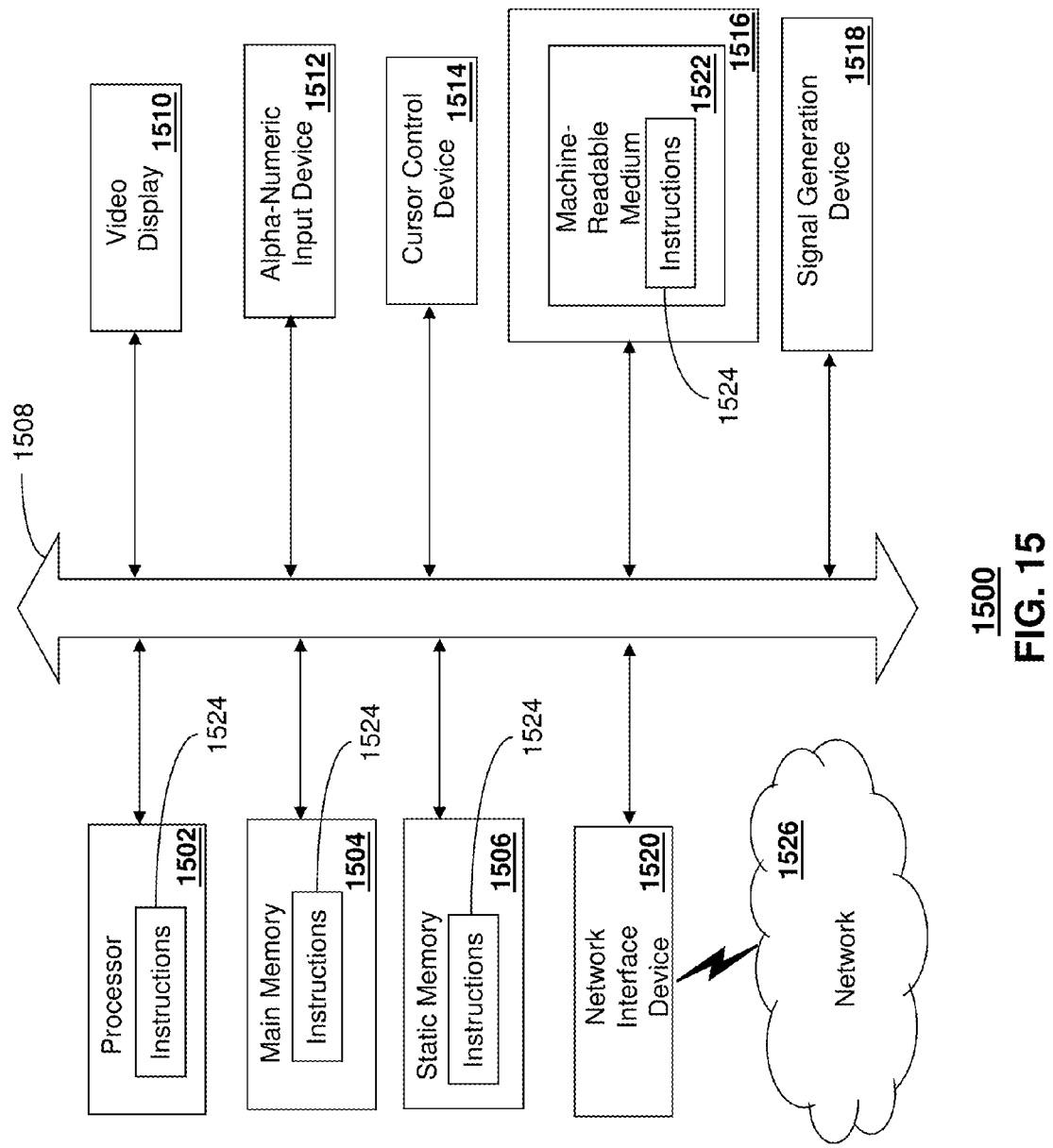

METHOD AND APPARATUS FOR PROCESSING CONTROL SIGNALS OF AN ACCESSORY

CROSS-REFERENCE TO RELATED APPLICATION(S)

This application is a continuation of U.S. patent application Ser. No. 13/777,616 filed Feb. 26, 2013, by Kim Rom et al., entitled "Method and Apparatus for Processing Control Signals of an Accessory." All sections of the aforementioned application are incorporated herein by reference in its entirety.

FIELD OF THE DISCLOSURE

The present disclosure relates generally to a method and apparatus for presenting processing control signals of an accessory.

BACKGROUND

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a mobile phone with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein:

FIG. 1 depicts an illustrative embodiment of a Graphical User Interface (GUI) generated by an Accessory Management Software (AMS) application according to the present disclosure;

FIGS. 2-3 depict illustrative embodiments for communicatively coupling a gaming controller to a computing device;

FIG. 15 depicts an illustrative diagrammatic representation of a machine in the form of a computer system within which a set of instructions, when executed, may cause the machine to perform any one or more of the methodologies disclosed herein.

DETAILED DESCRIPTION

Figure 4:
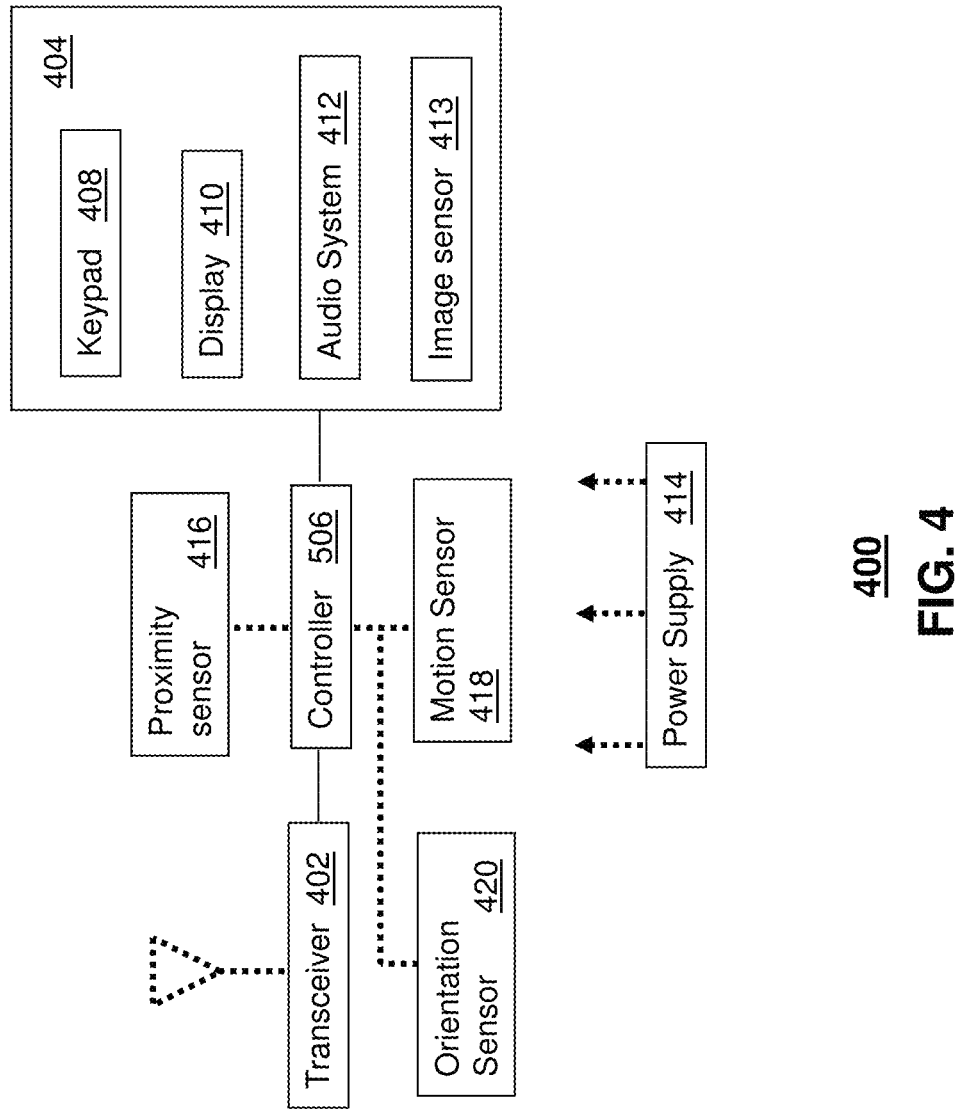
FIG. 4 depicts an illustrative embodiment of a communication device.

The subject disclosure describes, among other things, illustrative embodiments for processing and updating control signals of accessories (e.g., gaming accessories) to improve an expected result from the unadulterated application of the control signals to a software application (e.g., a video game). Other embodiments are contemplated by the subject disclosure.

One embodiment of the subject disclosure can entail a method for receiving from a gaming accessory a control signal for controlling a video game, determining from a present state of the video game a gaming result that would arise if the control signal were supplied to the video game, detecting from the gaming result that an update of the control signal will produce a desired gaming result, and generating an updated control signal to produce the desired gaming result.

One embodiment of the subject disclosure can entail a computer-readable storage medium, including computer instructions, which when executed by a processor cause the processor to perform operations including receiving from a gaming accessory a control signal for controlling a video game, determining a gaming result that would arise if the control signal were supplied to the video game, and generating an updated control signal to produce a desired gaming result responsive to detecting that the gaming result is undesirable.

One embodiment of the subject disclosure can entail a system, including a memory to store instructions, and a processor coupled to the memory. The processor can perform operations including receiving from a computer accessory a control signal for controlling a software application, determining a result that would arise if the control signal is supplied to the software application, and generating an updated control signal to produce a desired result responsive to detecting that the result is undesirable.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, or a media player (such as an iPOD™). It is contemplated that the AMS application can be executed by any device with suitable computing resources.

FIG. 2 illustrates a number of embodiments for utilizing a wireless dongle 203 with gaming controller 115 or a gaming console (herein referred to as gaming console 206). In the illustration of FIG. 2, the USB portion of the dongle 203 can be physically engaged with the gaming controller 115 or the gaming console 206. The dongle 203 in either of these configurations can facilitate wireless communications 204 between the gaming controller 115 and the gaming console 206 (e.g., WiFi, Bluetooth, ZigBee, or proprietary protocol). It is contemplated that functions of the dongle 203 can in whole or in part be an integral part of the gaming controller 115 or the gaming console 206. It is also contemplated that the AMS application can in whole or in part be executed by computing resources of the dongle 203.

In one embodiment, the gaming controller 115 can be tethered to a computer computing device such as the gaming console 206 by a cable (e.g., USB cable) as shown in FIG. 3 to provide a means of communication less susceptible to electromagnetic interference or other sources of wireless interference. In one embodiment, the gaming controller 115 and the gaming console 206 can have an integrated wireless interface for wireless communications therebetween. It is contemplated that the AMS application can in whole or in part be executed by computing resources of the gaming controller 115, the gaming console 206, or combinations thereof.

FIG. 4 depicts an illustrative embodiment of a communication device 400. Communication device 400 can serve in whole or in part as an illustrative embodiment of the devices depicted in FIGS. 1-3. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LIE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as a electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the present disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 to accommodate the implementation of the devices described by the present disclosure. These variant embodiments are contemplated by the present disclosure.

FIGS. 5-7A depict methods 500-700 describing illustrative embodiments of the AMS application. Method 500 can begin with step 502 in which the AMS application is invoked in a computing device. The computing device can be a remote server (not shown), the gaming console 206 of FIGS. 2-3, or any other computing device with suitable computing resources. The invocation step can result from a user selection of the AMS application from a menu or iconic symbol presented on a desktop of the computing device by an operating system (OS) managing operations thereof. In step 504, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the key board 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the Melee Action can be associated with a combination of key button presses (e.g., simultaneous depression of the left and right buttons 119, 121, or a sequence of button depressions: two rapid left button depressions followed by a right button depression).

In yet another embodiment, the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions and input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 526, once the associations have been recorded in a profile, the AMS application can determine in step 532 which of the accessories shown illustratively in FIGS. 1-3 are programmable and available for programming. If the AMS application detects that the accessories (e.g., keyboard 108, gaming controller 115) are communicatively coupled to a computing device from which the AMS application is operating (e.g., gaming console 306) and programmable, the AMS application can proceed to step 534 of FIG. 5 where it submits the profile and its contents for storage in one of the accessories (e.g., the gaming controller 115 in FIGS. 2-3) or the dongle 203. Once the gaming controller 115, dongle 303, or combinations thereof are programmed with the profile, such devices can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the present disclosure.

Figure 6:
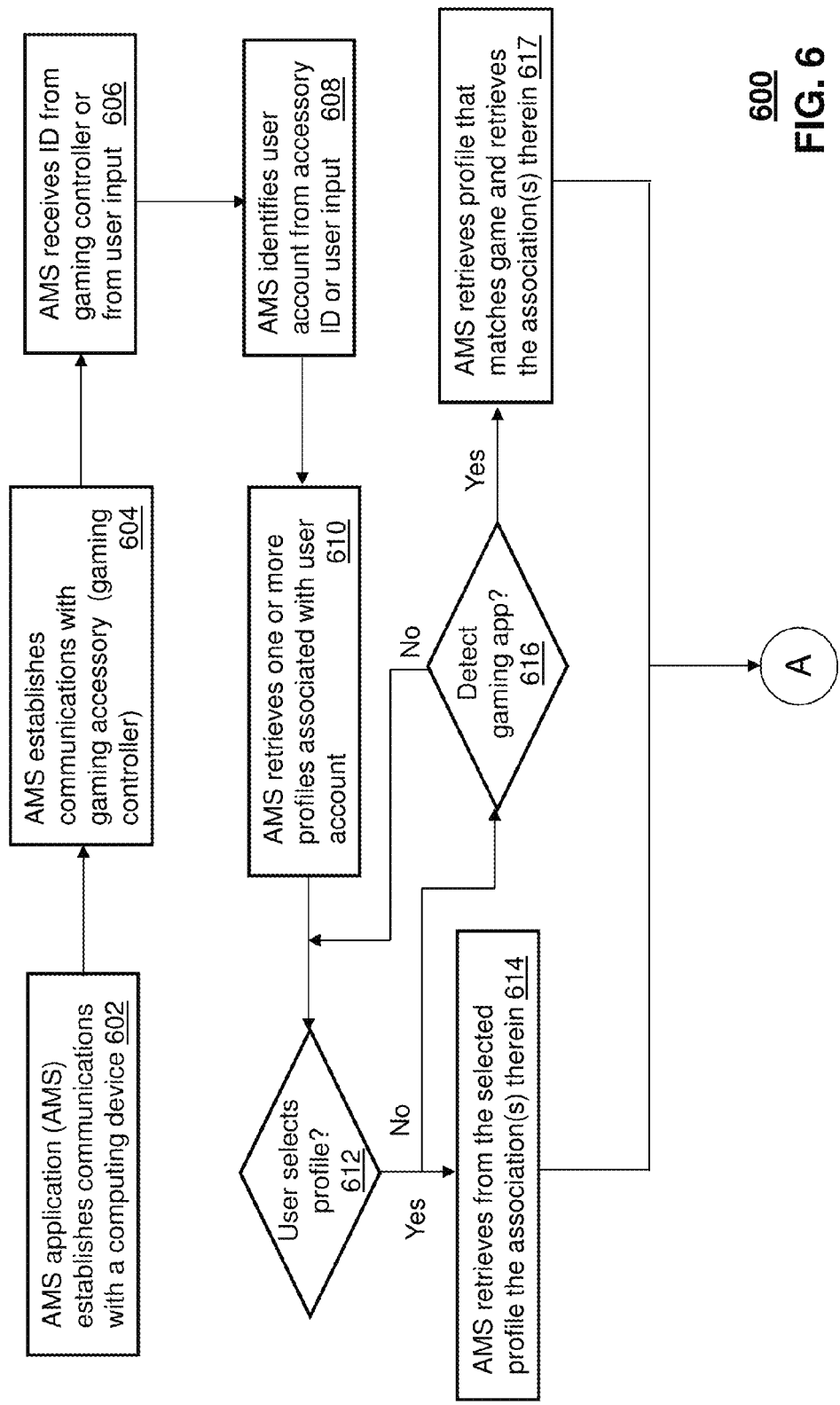
FIG. 6 depicts an illustrative embodiment of a second method utilized in the subject disclosure.

FIG. 6 depicts a method 600 for illustrating the operations of the AMS application for either of the configurations shown in FIGS. 2-3. In the configurations of FIGS. 2-3, the AMS application can be operating in whole or in part from the gaming controller 115, the dongle 203, the gaming console 206, a remote server (not shown), or a computing device such as a desktop computer (also not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other forms of suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

The AMS application can monitor in step 720 stimulations generated by the accessories coupled to the gaming console 206. The stimulations can be generated by the gamer by manipulating the gaming controller 115, and/or by generating speech commands detected by the headset 114. If a stimulation is detected at step 720, the AMS application can determine in step 722 whether to forward the detected stimulation(s) to an Operating System (OS) of the gaming console 206 without substitutions. This determination can be made by comparing the detected stimulation(s) to a corresponding associations in the profile. If the detected stimulation(s) match the associations, then the AMS application proceeds to step 740 where it retrieves substitute stimulation(s) in the profile. In step 742, the AMS application can substitute the detected stimulation(s) with the substitute stimulations in the profile. If on the other hand in step 722 the detected stimulation(s) do not match an association in the profile, then the AMS application proceeds to one of steps 744 or 746 in order to track the stimulations of the accessory. In one embodiment, the AMS application can track in step 744 the substitute stimulations by updating these stimulations with a unique identifier such as a globally unique identifier (GUID). In this embodiment, the AMS application can also add a time stamp to each substitute stimulation to track when the substitution was performed.

In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Once the stimulations received in step 720 have been substituted with other stimulations in step 742, and the AMS application has chosen a proper tracking methodology for correlating gaming action results with stimulations at step 744, the AMS application can proceed to step 748. From step 748 the method continues to step 770 of FIG. 7B. At step 770, the AMS can determine a gaming result that would arise if the stimulations (with or without substitutions) were supplied to the gaming software application. The gaming result can be determined a number of ways. For example, at step 772 the AMS application can perform image processing on a present state of the video game to predict a gaming result if the stimulus were supplied to the video game. FIG. 7C depicts an avatar 797 being controlled by a gamer using a gaming accessory such as a gaming controller, mouse, keyboard, or other suitable accessory device. Image processing technology can be used to process the image of FIG. 7C to detect a weapon utilized by the avatar 797. Additionally, image processing can be further performed to determine an aiming axis 798 of the weapon, which in turn can help predict whether a firing of the weapon will cause a hit of the creature shown in FIG. 7C and where such a hit would take place.

In the illustration, a creature is the enemy which the gamer is expected to hit to cause an injury or a kill. The aiming axis 798 appears to be slightly above the creature. Accordingly, if the stimulus received by the AMS application calls for a firing of the weapon without a re-aiming of the weapon first, the AMS application can predict in step 780 that the firing of the weapon will be ineffective and likely result in a misfire. Had the AMS application predicted a desirable result at step 780, the AMS application would then proceed to step 748 of FIG. 7A and supply the stimulation(s) (with or without substitutes) to the operating system for further processing.

If, however, the AMS application determines at step 780 that the result is undesirable (e.g., a misfire or a partial hit without serious injury), then the AMS application proceeds to step 782, where it can determine how the stimuli received at step 770 can be updated to create a desirable result based on an understanding of the game. For example, the AMS application can determine from a database look-up process the type of creature shown in the video game image and that killing or injuring the creature is an objective of the game. The AMS application can then determine with image processing that a desirable result can be achieved by re-aiming the weapon at an ideal location for shooting the creature. The AMS application can determine an offset 799 (in three or two dimensions) at the ideal location and thereby generate at step 782 updated stimulation(s) to cause a re-aiming of the weapon before the gaming software receives a stimulus that causes the weapon to fire.

At step 792 the AMS application can choose to replace at step 796 at least a portion of the prior stimulations with the updated stimulations for use in a live session of the game or record these substitutions for training the gamer at step 794. Choosing live updates of stimuli to improve a gamer's performance versus recording updates of stimuli for later training can be an option chosen by the gamer prior to starting the game by instructing the AMS application to store such option in a profile during the setup process described in FIG. 5. Training sessions can comprise recording an entire gaming session and then replaying the game with updated stimuli created at step 782 on one portion of a presentation screen while showing the gamer the outcome of the game without the updates on another portion of the screen.

In another embodiment, the gaming result can be determined at step 770 based on a simulation of the gaming software at step 774. In this embodiment, two instances of the gaming software can be invoked in parallel when the game is started. One of the instances of the gaming application can be used for live execution of the game, while the other (referred to herein as the simulation instance) can be used as a parallel application to determine an outcome of the game when a stimulation (with or without the substitutions of step 742) is supplied to the gaming software. In particular, the stimulations received at step 770 can be supplied to the simulation instance to determine the gaming result. Thus from the simulation the AMS application can determine that a firing of the weapon results in a misfire.

In another embodiment, the AMS application can determine at step 776 a misfire without image processing when a simulation instance of the gaming application by way of an application programming interface (API) provides the AMS application gaming results. The AMS application can then determine at step 780 whether the simulated result is desirable. If it is, the AMS application delivers the stimulation(s) (with or without substitutions) to the operating system at step 748 of FIG. 7A. If the result is not desirable (e.g., a misfire) the AMS application proceeds to step 782 where it generates updated stimuli to correct the aim of the weapon before it is fired. If the gaming results also provide trajectory information and position information of the avatar and the creature, updated stimuli that achieve the offset for an ideal shot can be determined with more accuracy. If such information is not available, the detected misfire can invoke image processing by the AMS application to determine the offset 799 (in three or two dimensions) and thereby updated stimuli for an ideal shot as described earlier.

To further improve the accuracy of generating updated stimuli to achieve a desired result, the AMS application can perform timing analysis at step 778. For example, the AMS application can determine trajectory and rate of movement of the avatar and the creature shown in FIG. 7C to determine how fast to re-aim and shoot. The timing analysis can be used in whole or in part to update the stimuli received at step 770. State information (e.g., health of avatar vs. enemy) supplied by the video game in step 784, invoking a simulation instance at step 786, using a history of prior stimulations and corresponding results at step 788, and/or a performing a trial and error analysis with a simulation instance of the video game at step 790 can be used singly or in combination to determine the updated stimuli.

Figure 7A:
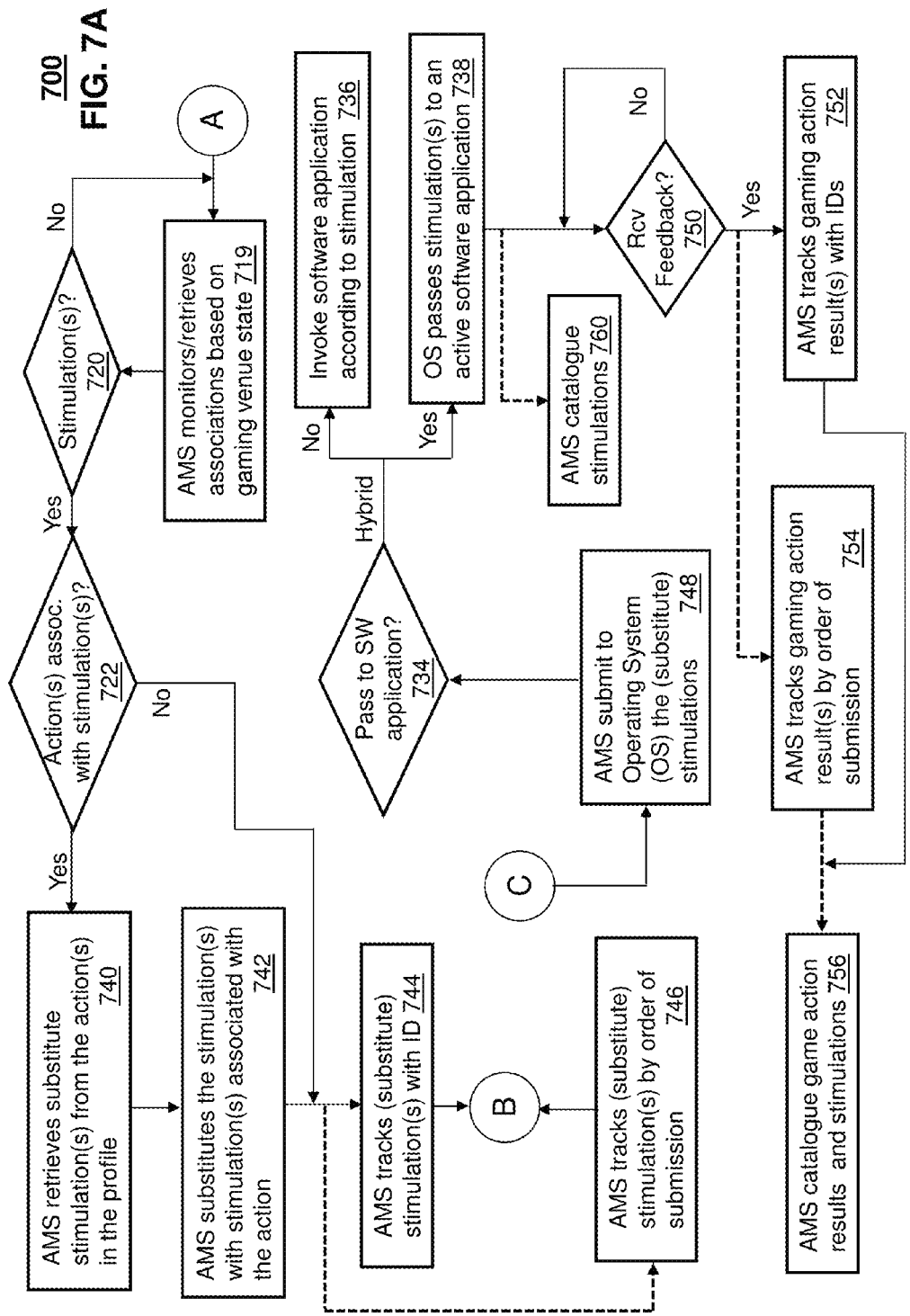
FIG. 7A depicts an illustrative embodiment of a third method utilized in the subject disclosure.

Once updated stimuli are determined, the AMS application can proceed to step 748 of FIG. 7A and submit the substitute stimulations to the OS of the gaming console 206.

In step 734, the OS determines whether to invoke in step 736 a software application identified in the stimulation(s) (e.g., gamer says "turn on team chat", which invokes a chat application), whether to forward the received stimulations to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulations sent in step 738.

For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 752 to identify the stimulation having the same ID. If on other hand, the order of game action results can be maintained consistent with the order of the stimulations, then the AMS application can correlate in step 754 stimulations with game action results by the order in which stimulation were submitted and the order in which game action results were received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 8:
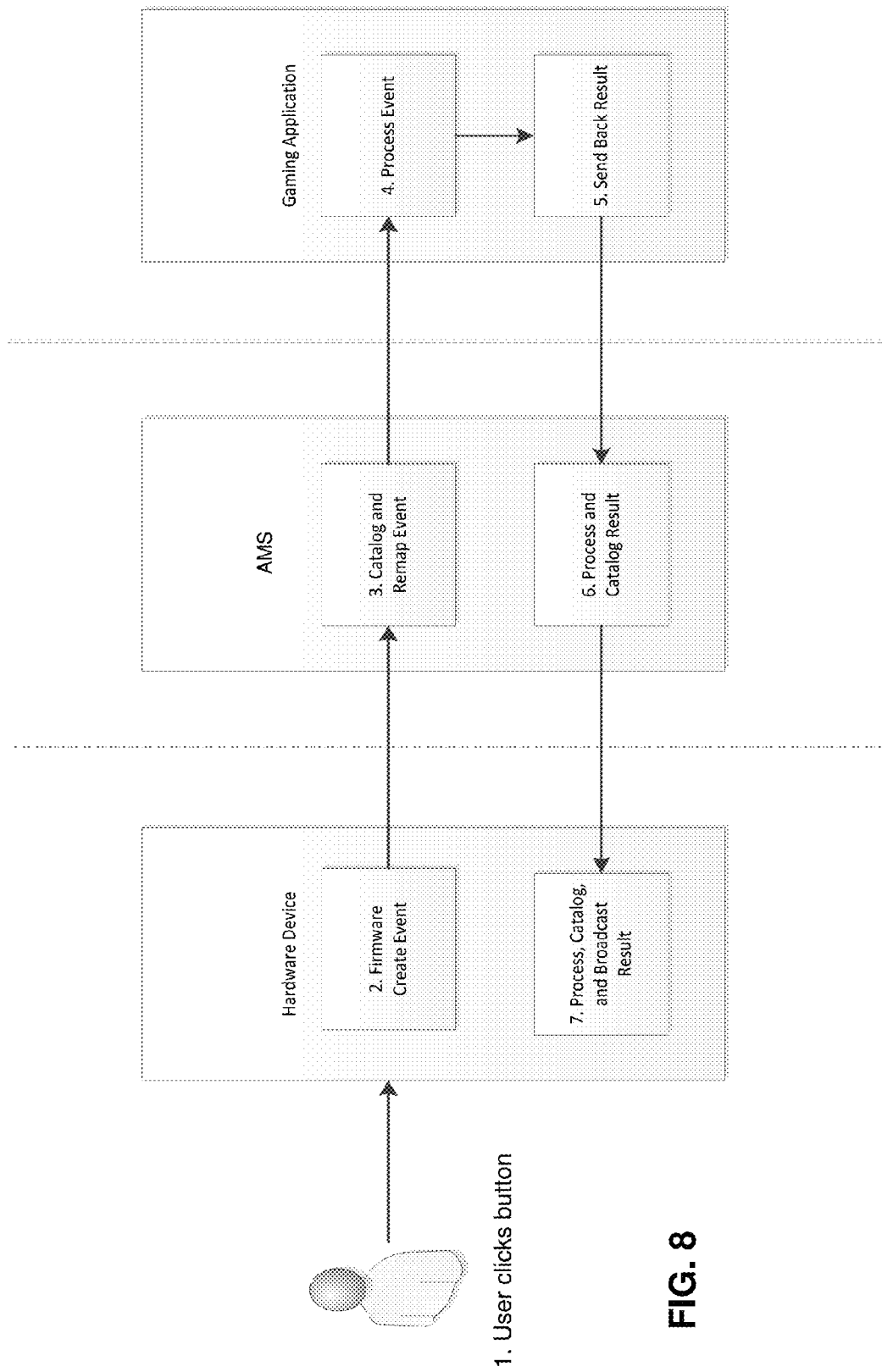
FIG. 8 depicts an illustrative embodiment of a system operating at least in part according to the methods of FIGS. 5-7.
Figure 9:
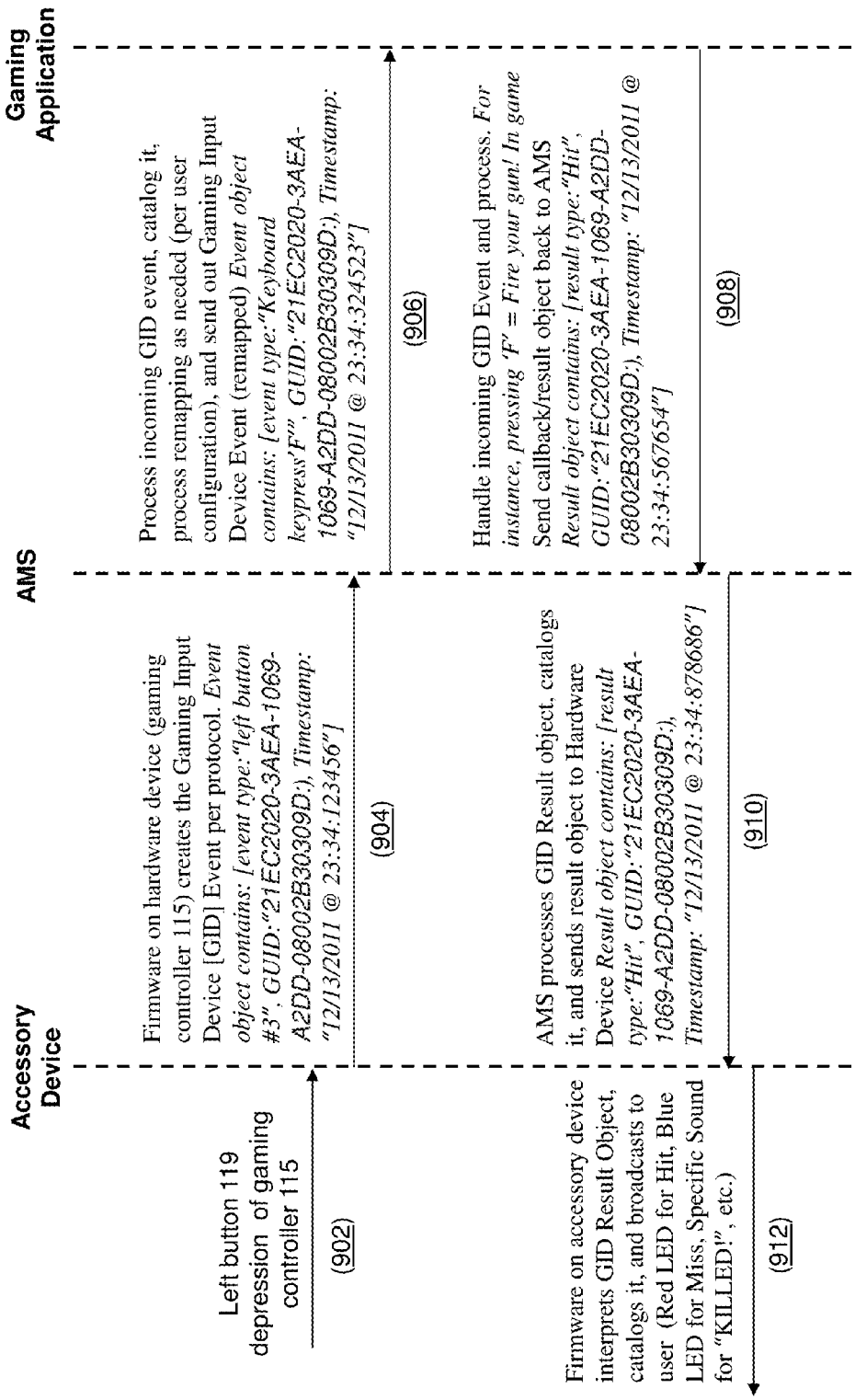
FIG. 9 depicts an illustrative embodiment of a communication flow diagram utilized by the system of FIG. 12.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

The AMS application can catalogue results as shown in FIGS. 11-14. The presentation of the catalogued results can be based on a live session, or a replay session when reviewing segments of a video game much like a replay session of a sporting event (e.g., football game) is analyzed by sports analysts. To assist the audience in viewing a competition between gamers, the AMS application can be adapted to present a virtual peripheral representative of the accessory of each gamer as shown in FIGS. 11-14.

Figure 10:
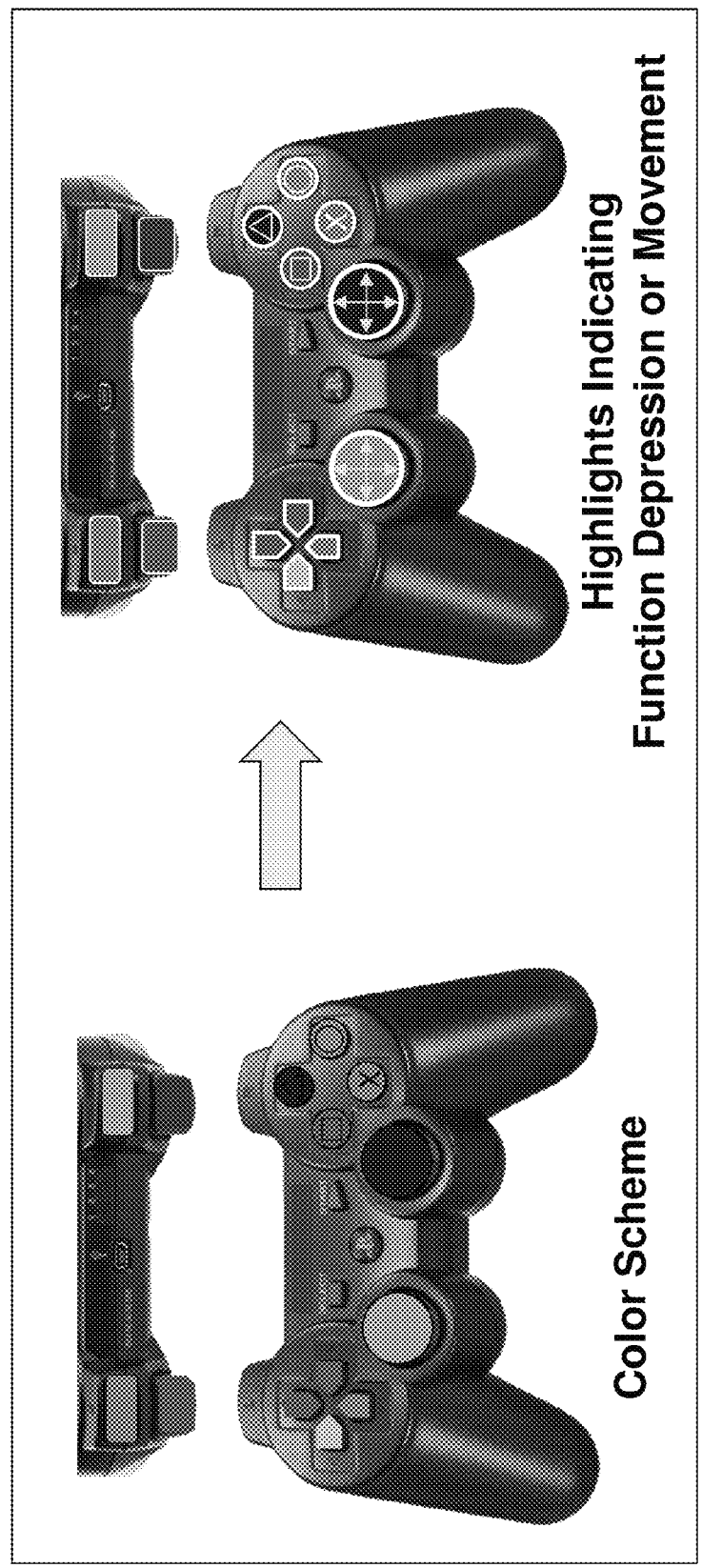
FIG. 10 depicts an illustrative embodiment for highlighting functions of an accessory.

The AMS application can be adapted to use coloring and highlight schemes to indicate when a function (e.g., a button or navigation knob) of the peripheral is being used as shown in FIG. 10. For example, the color code "dark red" can represent a button or knob that is frequently in use, while a color code of "dark blue" can represent a button or knob that is infrequently used. To indicate when a button or knob is in use, the button or knob can be highlighted with a white outline while the unused buttons can remain unhighlighted. In the case of knobs, which can be moved omnidirectionally, the AMS application can show movements of a highlighted knob as the gamer is utilizing the knob based on the stimulations received by the AMS application.

For example, if a gamer moves a knob in a northwest direction, the knob is highlighted with a white outline, and the knob is shown moving in the direction chosen by the gamer. As buttons are being depressed and released rapidly, the AMS application will present rapid transitioning between the enabling and disabling of highlights to indicate the speed that the gamer is depressing and releasing the buttons. As the frequency of depressions of buttons or use of knobs increases, the AMS application will change the color code of the buttons or knobs as described above to signify frequency of use of the buttons and knobs.

In an embodiment where the AMS application receives gaming results from a gaming application via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

Figure 11:
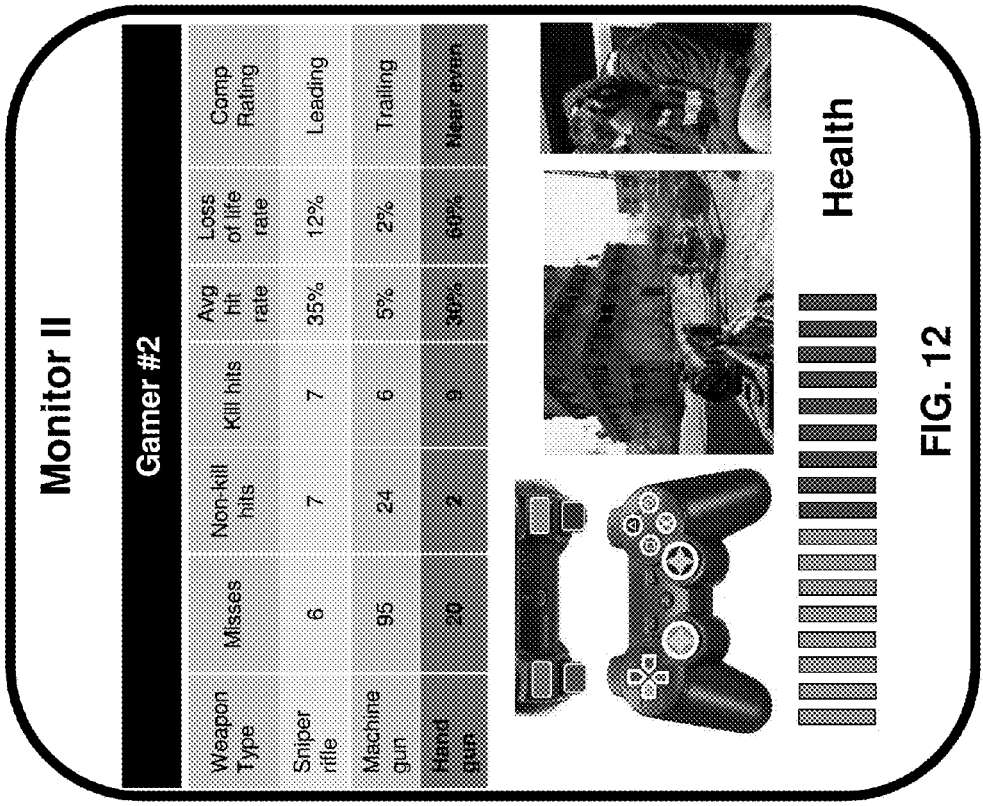
FIGS. 11-14 depict illustrative embodiments for presenting performances of garners.
Figure 12:
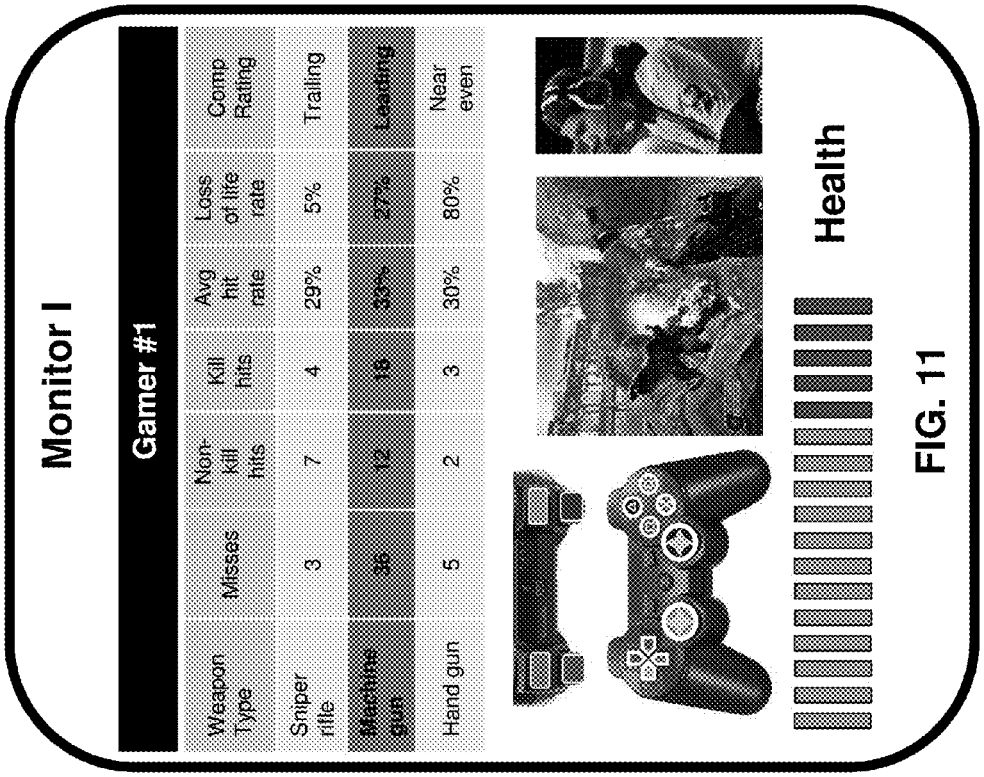

The AMS application can present performance factors of each gamer, and the type of weapons being tracked (e.g., sniper rifle, machine gun, hand gun) as shown in FIGS. 11-12. To identify which weapon is being used at any point in time during a gaming session, the AMS application can highlight the weapon in a distinguishable color such as blue while keeping all other weapon rows in gray. The AMS application can calculate an average hit rate from the misses, non-kill hits, and kill hits. The AMS application can compare gaming action results between the gamers to identifying leading performance factors as shown in the "Comp Rating" column of each player. In a tournament setting, the performance factors shown in FIGS. 11 and 12 can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115. To further enhance the experience for the audience, the gamer's image can be shown as a video clip during the competition. The AMS application can also be adapted to present a portion of the video game associated with each gamer as shown in FIGS. 11-12.

Figure 13:
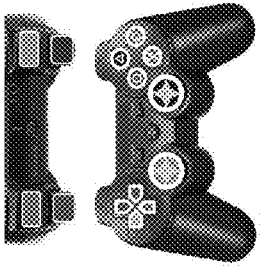
Figure 14:

In an embodiment where the gaming application does not provide gaming action results (e.g., the video gaming application does not provide an API), the AMS application can be adapted to present a gamer's performance based on the stimulus signals generated, and where applicable, the substitute stimulus signals submitted to the gaming application as shown in FIGS. 13-14. In this illustration, the virtual peripherals are shown with the color scheme and highlights discussed earlier. The performance of the gamers can be presented according to the type of weapons used, the key depressions invoking substitutions, the macros invoked, and the rate of transmission of stimuli to the gaming application.

For example, for gamer #1, the simultaneous depression of the up and down arrows invoked the macro team chat, while using the sniper rifle. The gamer shot the rifle 14 times with 4 shots in rapid succession. Upon depressing the left "1" button of a front section of the gaming controller 115 of gamer #1, the AMS application invoked substitute stimuli transmitted to the gaming application which switches the use of the sniper rifle to the machine gun. A subsequent depression of the same button can cause a substitute stimuli generated by the AMS application to return to the sniper rifle. A depression of the right "1" button by gamer #1 resulted in substitute stimuli generated by the AMS application to call for air support. Gamer #2 shows that s/he has not invoked a substitute stimuli for the machine gun. This may be because the gamer has not pre-programmed the AMS application to associate stimuli generated by the gaming controller 115 with substitute stimuli, or because the gamer has chosen not to invoke substitute stimuli with a particular key depression (or sequence of key depressions).

Although not shown, monitoring stimuli generation and substitutes can be used to rate players' performances. For example, a gamer that has a tendency to perform rapid fire on a machine gun without saving ammunition may be viewed as a poor game tactic. Comparing such statistics between gamers can be used to show performance lead factors between the gamers.

From the foregoing descriptions, it would be evident to an artisan with ordinary skill in the art that the aforementioned embodiments can be modified, reduced, or enhanced without departing from the scope and spirit of the claims described below.

Figure 7B:
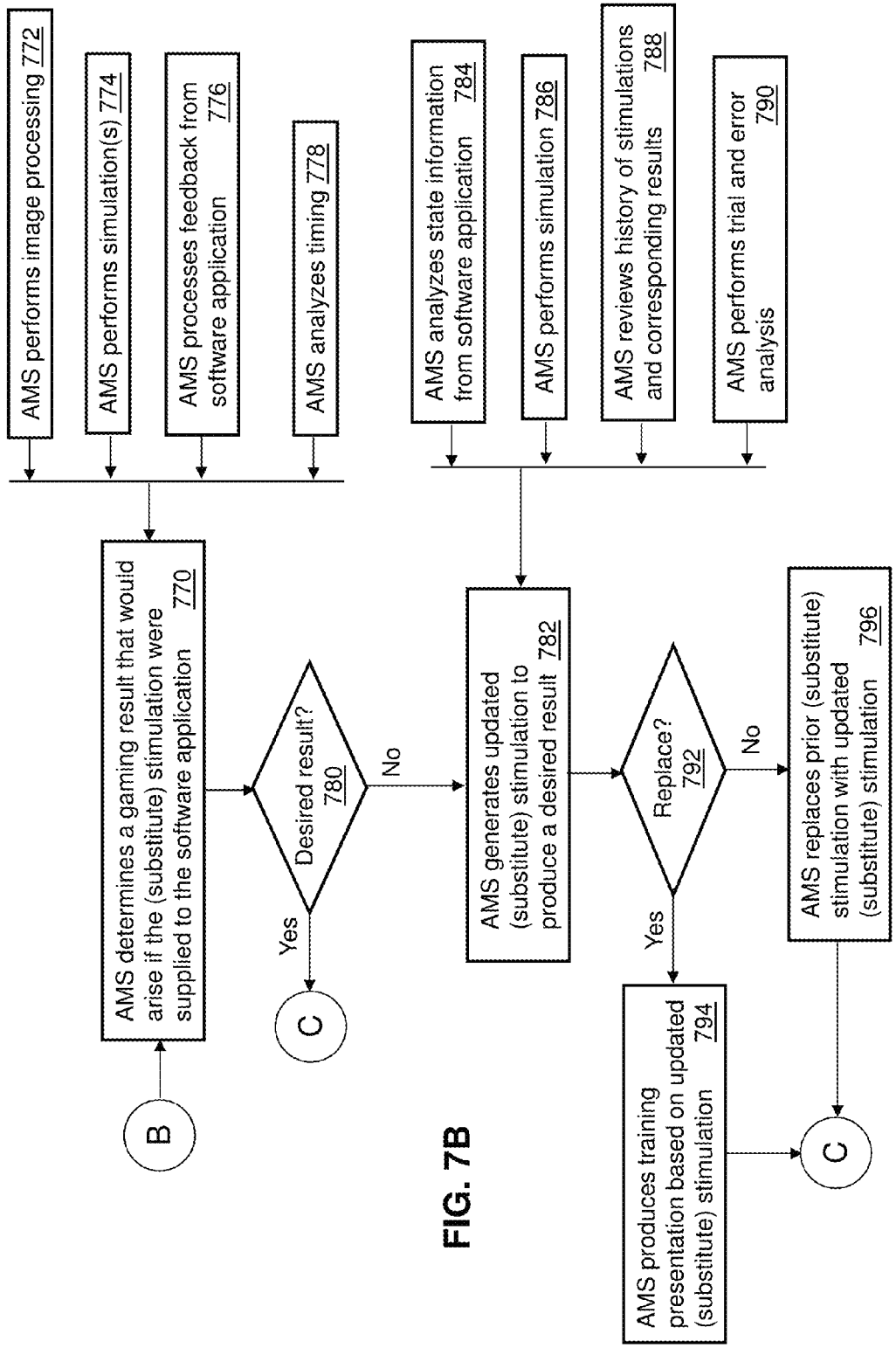
FIG. 7B depicts an illustrative embodiment of a fourth method utilized in the subject disclosure.
Figure 7C:
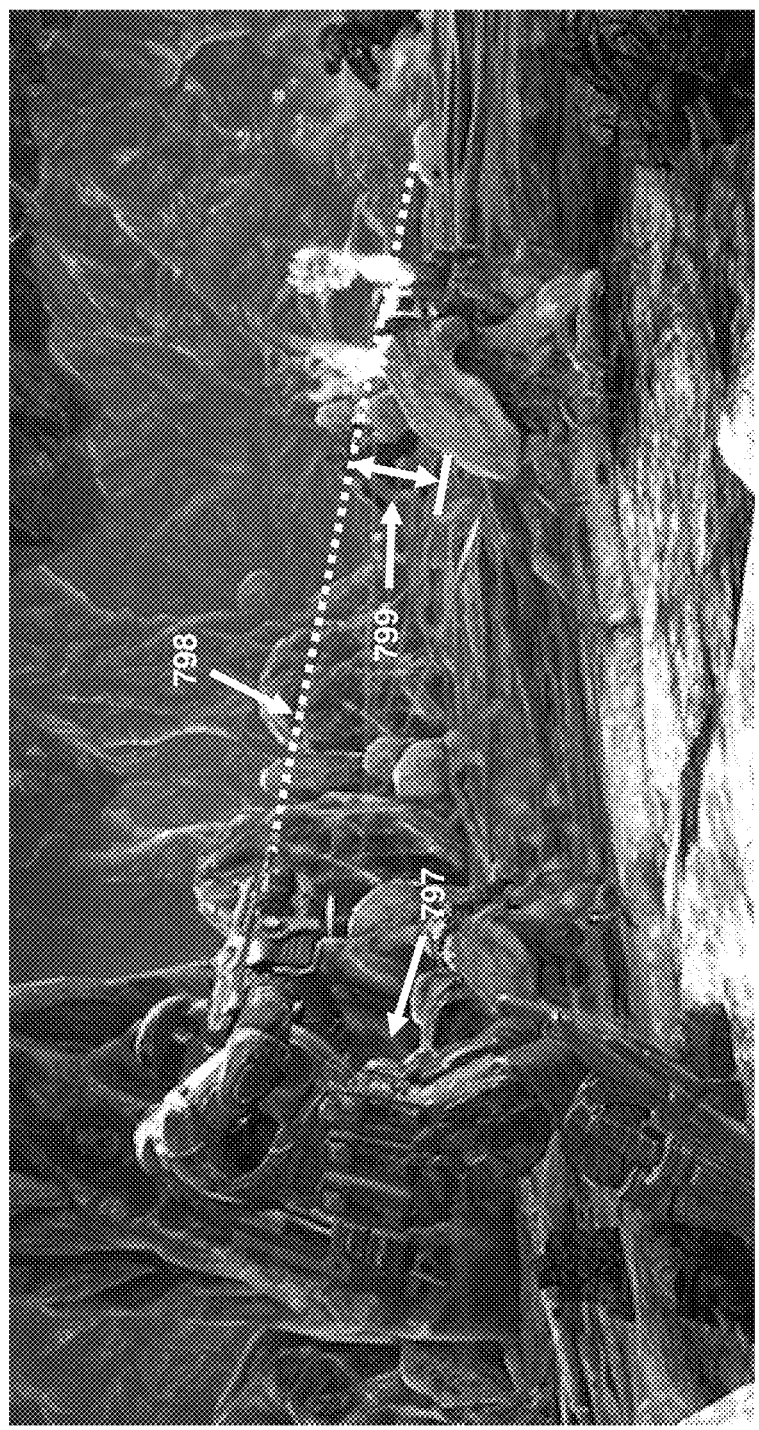
FIG. 7C depicts an illustrative embodiment of an avatar presented by a video game performing an action that does not produce a desired result.

For example, the method of FIG. 7B can be adapted to analyze which buttons of an accessory (e.g., mouse, keyboard, etc.) were depressed or otherwise selected to perform game actions. The AMS application can for example detect that the user selected the button sequence Ctrl S as one of the stimuli sent to the video game. If the keystroke Ctrl S is not recognized by the video game as a valid game command, the AMS application can immediately determine that the gamer may have accidentally selected an improper key(s). The AMS application can determine from a library of keystrokes recognized by the video game that the keystroke Ctrl A and Ctrl D are recognized commands.

The AMS application can further recognize from the context of the video game at the time the keystroke Ctrl S was received (determined by image processing or feedback from the API of the video game) that Ctrl D would perform an action that would not achieve a desired gaming result, while Ctrl A would. Since the letters A and D are adjacent to the letter S, the AMS application can safely assume that the intended keystroke would have been the letter A, and from this assumption the AMS application can proceed to update the stimuli by replacing Ctrl S with Ctrl A. In another embodiment, if only Ctrl A is a recognized command and Ctrl D is not, then the AMS application can select Ctrl A on the assumption that this would have been the keystroke the gamer likely wanted to choose without analyzing game images or feedback provided by the video game. Accordingly, the AMS application can perform gaming result analysis with or without image processing, simulation, or even feedback from the video game.

In another embodiment, the AMS application can be adapted to record stimulus signals and/or gaming results for a game session and store this data for an extended period of time for each of a plurality of gamers. In addition, the AMS application can store multiple recorded game sessions for each gamer and can be adapted to compare a history of game sessions to assess how each gamer's performance has evolved. Each gamer's improvement or degradation detected by the AMS application over a number of gaming sessions can be reported to the gamer and/or other gamers as progression line charts, histograms, pie charts or other suitable presentation methods. The results can also be reported in a gaming tournament, on-line games, or other suitable setting in a manner similar to the illustrations of FIGS. 11-14.

The AMS application can compare a gamer's performance in a particular game to a gaming session recorded from a prior tournament for the same game or another game. Performance in the present context can mean a comparison of only stimulus signals (e.g., accessory-generated stimulus signals and/or substitute stimulus signals). This embodiment may be user-selectable (i.e., user selects stimulus analysis only) by way of a GUI presented by the AMS application, or the AMS application may apply this embodiment automatically in instances where the AMS application does not receive gaming action results from the gaming application due to a lack of an API or other suitable interface to receive gaming action results from the gaming application. Performance can also mean a comparison of only gaming action results and not stimulus signals, which can also be a user-selectable feature presented by a GUI generated by the AMS application. Performance can further represent a combination of gaming action results and stimulus signals with similar data of other recorded gaming sessions. In sum, a gamer's performance can be determined from stimulus signals (with or without substitute stimulus signals), and/or gaming action results in whole or on part monitored by the AMS application.

For any one of the foregoing embodiments, the AMS application can detect improvements or degradations in performance between a present tournament game and the previously recorded tournament game and report the results to the gamer and/or an audience of on-line gamers or a public audience at a tournament via the monitors of FIGS. 11-14. The foregoing embodiments can be applied in a private setting (i.e., only visible to the gamer) and/or a social network of garners who share and present results via the AMS application or a social network such as FaceBook™ or other suitable social network platform.

In yet another embodiment, the AMS application can be adapted to compare a gamer's performance to another gamer's recorded performance. In a tournament setting, for example, the gamers' performance can be compared to each other based on the present gaming session or prior recorded sessions of the other gamer. In one embodiment, the AMS application can be adapted to present a GUI where it presents a list of gamers and recorded sessions from each gamer. The GUI can enable a user to select a particular gamer and a particular recorded gaming session of the selected gamer for comparison to a recorded (or live) gaming session of the user making the selection or another gamer of interest to the user (e.g., comparing the performance of two professional gamers).

It should be noted that gaming sessions recorded by the AMS application can be locally stored on a gamer's computing device (e.g., desktop computer or gaming console) or on a remote server managed by a service provider of the AMS application or by a service provider that provides "Cloud" storing services. Comparison results can similarly be stored on a gamer's local computing device or a remote server.

In yet another embodiment, the AMS application can be adapted to alert users when a particular gamer has achieved certain performance criteria established by another gamer. For instance, the AMS application can present a GUI to a gamer to identify performance criteria of interest (e.g., number of kill hits, average hit rate for a particular weapon, a particular ranking of a gamer for a particular gaming application, etc.). The identified performance criteria can be monitored by the AMS application for the selected gamer and when one or more criteria have been achieved by the monitored gamer, the AMS application can alert the interested user by suitable communication means such as email, short messaging system (SMS) text message, or a GUI of the AMS application when the interested user is engaging the AMS application.

In another embodiment, the AMS application can compare the performance of the gamers to a community rating localized to users of the gaming console 206, or all or a portion of on-line users which can span a large community of users of the gaming application. For example, although an average hit rate of 5% for a sniper rifle may seem low for gamer #1 in FIG. 11, when these statistics are compared to other members of a community (e.g., other professional players), the AMS application can determine from prior performance records of members of the community (retrieved from a local or remote database) that the user's performance is in fact above average. Similar community comparisons can be performed for the weapon type "machine gun" and "hand gun". The AMS application can also monitor and track statistics of other gaming applications which may have different weapon types. Similar statistics can be generated and compared to the performance of members of a community to which the gamer is associated.

In one embodiment, the statistical results shown in FIGS. 11-14 can be used to identify behavioral and/or skill patterns of a gamer. For instance, suppose a gamer appears to perform well as a sniper in one gaming application and bow and arrow marksman in a different gaming application. The AMS application can be adapted to detect these correlations to indicate a skill set of the gamer that may be consistent between different games. For example, a sniper and bowman have a similar trait that requires marksmanship, calm nerves, and knowing when to strike. This trait can be identified by the AMS application and can be used to identify other games in which the gamer may perform well. This trait can also be advertised to other gamers to promote teams.

Figure 5:
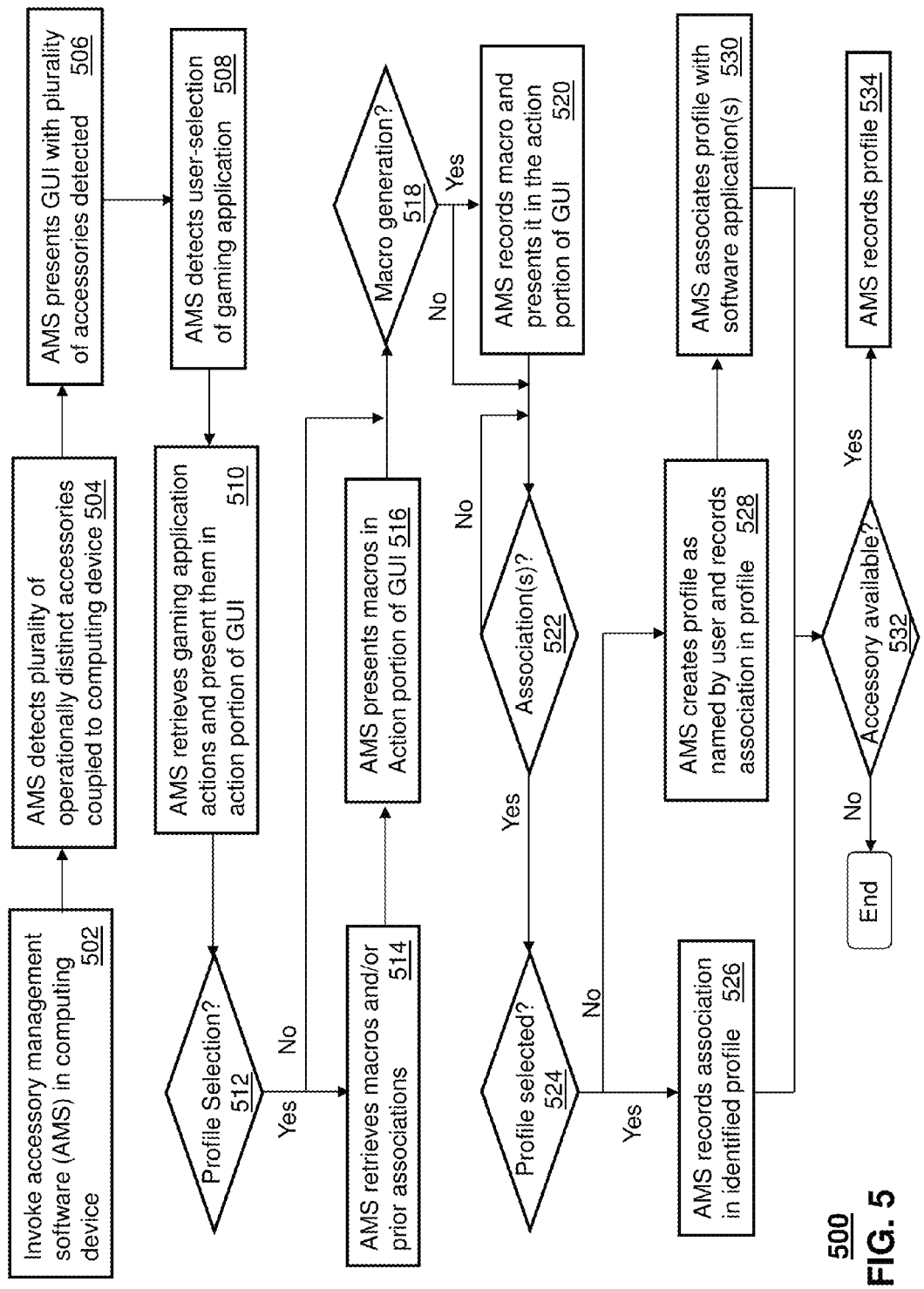
FIG. 5 depicts an illustrative embodiment of a first method utilized in the subject disclosure.

The methods of FIGS. 5-7 can be adapted to operate in whole or in part in a gaming accessory, in an operating system of a computer, in a gaming console, in a gaming application that generates the video game, in a dongle, or any other suitable software application and/or device.

The method of FIG. 7 can be adapted to ignore or filter game action results, which may not be relevant to the gamer or analysts. For instance, the AMS application can be adapted to ignore (or filter) game action results relating to navigation of the avatar (e.g., turn around, jump, etc.). The AMS application can also be adapted to ignore (or filter) game action results relating to preparatory actions such as reloading a gun, switching between weapons, and so on. In another embodiment, the AMS application can be adapted to selectively monitor only particular game result actions such as misses, non-kill hits, kills, and life of the avatar. The AMS application can also be adapted to monitor gaming action results with or without temporal data associated with the stimuli and game action results.

In one embodiment, the AMS application can be adapted to track stimuli (or substitutions thereof) by submission order, and order of gaming action results supplied by the gaming application, and perform cataloguing thereof by the respective order of stimuli and gaming action results. The items can be catalogued by the AMS application with or without temporal data.

In one embodiment, the AMS application can be adapted to collect gaming action results for "all" or a substantial portion of stimuli (or substitutions thereof) transmitted to the gaming application. In this embodiment, the AMS application can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In one embodiment, the AMS application can be implemented as a distributed system (e.g., one or more servers executing one or more virtual machines) enabling multiples users to control aspects of the AMS application. For example, in a tournament setting, gaming analysts having access to the AMS application can request a replay of portions of the game to demonstrate exceptional plays versus missed plays at a JumboTron™ display. The gamers can access the AMS application to establish new substitute stimuli, perform calibrations on macros, or invoke or create additional gaming profiles. Portions of the AMS application can also be implemented by equipment of unaffiliated parties or service providers of gaming services.

In one embodiment, the AMS application can be adapted to substitute an accessory stimulus (or stimuli) for a macro comprising a combination of substitute stimuli, and track the macro when gaming action results are received from the gaming application rather than track each individual substitute stimulus of the macro. The AMS application can be adapted to monitor macros by tracking an order of stimuli (or substitutes) associated with the macro that are transmitted to the gaming application and by tracking an order of gaming action results received from the gaming application, which are associated with the macro. Alternatively, or in combination the AMS application can add a unique identifier to the substitute stimuli to identify the stimuli as being associated with the macro.

The AMS application can be adapted to catalogue the gaming action results associated with the macro in a manner that allows the gamer to identify a group of gaming action results as being associated with the macro. The AMS application can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. The AMS application can be adapted to enable the gamer to select a different GUI that enables the user to visualize a gaming action result for each stimulus of the macro to determine how effective the macro was in performing the kill, and whether further adjustments of the macro might improve the gamer's performance.

In one embodiment, the AMS application can be adapted to present more or less competitive information than is shown in FIGS. 11-14. In one embodiment, for example, the AMS application can be adapted to present competitive information without the virtual peripherals. In one example, the AMS application can be adapted to present scrollable pages of competitive information with or without the virtual peripherals. In another illustration, the AMS application can be adapted to present competitive information without a viewing of the game or the gamer. Other variants of presenting competitive information or other data shown in FIGS. 11-14 are contemplated by the present disclosure.

The foregoing embodiments are a subset of possible embodiments contemplated by the present disclosure. Other suitable modifications can be applied to the present disclosure.

FIG. 15 depicts an exemplary diagrammatic representation of a machine in the form of a computer system 1500 within which a set of instructions, when executed, may cause the machine to perform any one or more of the methods discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, or a solid state display. The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LIE) are contemplated for use by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
generating, by a processing system comprising a processor, a control signal from a first input device stimulation for controlling a video game according to a first setting associated with the control signal;
generating, by the processing system, a predicted gaming result corresponding to an application of the control signal to the video game;
determining, by the processing system, whether the predicted gaming result that is received from the first device is not a desired gaming result;
responsive to determining that the predicted gaming result is not the desired gaming result, determining, by the processing system, a new setting associated with the control signal that will produce the desired gaming result according to a prior history of control signal settings and corresponding gaming results;
generating, by the processing system, an updated control signal according to the new setting of the control signal; and
providing, by the processing system, the updated control signal to the video game.

2. The method of claim 1, further comprising receiving, by the processing system, the predicted gaming result from the video game.

3. The method of claim 1, further comprising receiving, by the processing system, the first input device stimulation from an input device.

4. The method of claim 1, wherein new setting associated with the control signal is determined by:
determining, by the processing system, that the predicted gaming result is not the desired gaming result due to improper aiming of a weapon in the video game;
determining, by the processing system, a new aim for the weapon; and
generating, by the processing system, the updated control signal to cause the weapon to have the new aim.

5. The method of claim 4, wherein the improper aiming of the weapon causes a misfire.

6. The method of claim 1, wherein new setting associated with the control signal is determined by:
determining, by the processing system, that the predicted gaming result is not the desired gaming result due to improper timing of firing of a weapon in the video game;
determining, by the processing system, a new timing for firing the weapon; and
generating, by the processing system, the updated control signal to cause the weapon to fire according to the new timing.

7. The method of claim 1, wherein new setting associated with the control signal is determined by:
determining, by the processing system, that the predicted gaming result is not the desired gaming result due to improper execution time for the control signal in the video game;
determining, by the processing system, a new execution time for the control signal; and
updating, by the processing system, the control signal according to the new execution time to generate the updated control signal.

8. The method of claim 1, wherein new setting associated with the control signal is determined by:
determining, by the processing system, that the predicted gaming result is not the desired gaming result due to improper position of an avatar in the video game;
determining, by the processing system, a new position for the avatar; and
generating, by the processing system, updated control signal to cause the avatar to move to the new position.

9. The method of claim 8, wherein the improper position of the avatar makes the avatar vulnerable.

10. The method of claim 1, wherein determining the predicted gaming result is based on a simulation of the video game.

11. The method of claim 1, wherein generating the updated control signal comprises processing, by the processing system, images of the video game to generate the updated control signal.

12. The method of claim 1, wherein generating the updated control signal comprises performing, by the processing system, a simulation of the video game to generate the updated control signal.

13. The method of claim 1, wherein generating the updated control signal comprises:
receiving, by the processing system, trajectory information from the video game; and
determining, by the processing system, the updated control signal from the trajectory information.

14. The method of claim 1, comprising:
presenting, by the processing system, an original presentation of the video game based on the control signal; and
presenting, by the processing system, an alternate presentation of the video game based on the updated control signal to train a user of the first input device.

15. The method of claim 14, comprising presenting, by the processing system, information describing the updated control signal.

16. The method of claim 1, wherein the processing system comprises one of a gaming console, a server, or a computer, and wherein the video game is executed by one of the processing system, a remote server communicatively coupled to the processing system, or a combination thereof.

17. A machine-readable storage medium, comprising executable instructions that, when executed by a processing system including a processor, facilitate performance of operations, comprising:
transmitting, to a first device, a control signal associated with a gaming accessory to control a video game that is executing a video game;
receiving, from the first device, a first gaming result that would arise if the control signal were supplied to the video game;
determining whether the first gaming result that is received from the first device is not a desired gaming result; and
generating an updated control signal according to a new setting of the control signal for producing the desired gaming result at the video game according to prior history of control signal settings and corresponding gaming results responsive to determining that the first gaming result is not the desired gaming result.

18. The machine-readable storage medium of claim 17, wherein the operations further comprise providing the updated control signal to the video game.

19. The machine-readable storage medium of claim 17, wherein the control signal is based on a substitution of an accessory signal generated by the gaming accessory.

20. A system, comprising:
a processing system including a processor; and
a memory that stores executable instructions that, when executed by the processing system, facilitate performance of operations, comprising:
transmitting, to a first device, a control signal associated with a gaming accessory to control a video game that is executing a video game;
determining whether a first gaming result that would arise if the control signal were supplied to the video game is not a desired gaming result; and
generating an updated control signal according to a new setting of the control signal for producing the desired gaming result at the video game according to prior history of control signal settings and corresponding gaming results responsive to determining that the first gaming result is not the desired gaming result.

* * * * *